US008255891B2

(12) United States Patent
Chen et al.

(10) Patent No.: US 8,255,891 B2
(45) Date of Patent: Aug. 28, 2012

(54) COMPUTER-IMPLEMENTED METHOD AND SYSTEM FOR IMPROVED DATA FLOW ANALYSIS AND OPTIMIZATION

(75) Inventors: Zhenqiang Chen, Shanghai (CN); Lei Jin, Shanghi (CN); Jiangang Zhuang, Fujian (CN)

(73) Assignee: Intel Corporation, Santa Clara, CA (US)

( * ) Notice: Subject to any disclaimer, the term of this patent is extended or adjusted under 35 U.S.C. 154(b) by 1063 days.

(21) Appl. No.: 12/096,944

(22) PCT Filed: Dec. 30, 2005

(86) PCT No.: PCT/CN2005/002404
§ 371 (c)(1),
(2), (4) Date: Jun. 11, 2008

(87) PCT Pub. No.: WO2007/076630
PCT Pub. Date: Jul. 12, 2007

(65) Prior Publication Data
US 2008/0288930 A1    Nov. 20, 2008

(51) Int. Cl.
*G06F 9/45* (2006.01)
(52) U.S. Cl. .......................................... 717/155
(58) Field of Classification Search .................. None
See application file for complete search history.

(56) References Cited

U.S. PATENT DOCUMENTS

| 6,226,789 | B1 | 5/2001 | Tye et al. | |
|---|---|---|---|---|
| 2002/0095669 | A1* | 7/2002 | Archambault | 717/157 |
| 2005/0132344 | A1* | 6/2005 | Vorbach et al. | 717/151 |

FOREIGN PATENT DOCUMENTS

CN    1502077    6/2004

OTHER PUBLICATIONS

Bodik, Rastislav; Gupta, Rajiv. "Array Data Flow Analysis for Load-Store Optimizations in Fine-Grain Architectures." Published in 1996. Journal of Parallel Programming. pp. 1, 4-6, and 11.*
"International Application Serial No. PCT/CN2005/002404, International Search Report mailed Nov. 23, 2006", 6 pgs.

* cited by examiner

*Primary Examiner* — Wei Zhen
*Assistant Examiner* — Adam R Banes
(74) *Attorney, Agent, or Firm* — Schegman, Lundberg & Woessner, P.A.

(57) ABSTRACT

A computer-implemented method and system for improved data flow analysis and optimization are disclosed. The method and system generates data flow analysis information from vectorized processing components, the data flow analysis information including an input information set and an output information set, generates hole information from the vectorized processing components, selects needed holes based on the input information set, the output information set, and the hole information, and modifies a portion of the data flow analysis 10 information by retaining needed holes and removing holes not identified as needed holes from the vectorized processing components.

12 Claims, 4 Drawing Sheets

COMPUTER-IMPLEMENTED METHOD AND SYSTEM FOR IMPROVED DATA FLOW ANALYSIS AND OPTIMIZATION

Related Applications

This application is a U.S. National Stage Filing under 35 U.S.C. 371 from International Patent Application No. PCT/CN2005/002404, filed on Dec. 30, 2005, and published in English as WO 2007/076630 on Jul. 12, 2007, which is incorporated herein by reference in its entirety.

BACKGROUND

1. Technical Field

This disclosure relates to methods and systems supporting data flow analysis. More particularly, the present disclosure relates to improved data flow analysis and optimization.

2. Related Art

Conventional computing systems can modify a linked code module by eliminating dead code and moving loop-invariant code from loops. Known compilers can convert array calculations appearing in a loop into vector calculations. Other conventional systems include a dynamic compiler that can emit machine code. Responsive to the emission of the machine code a post pass processor creates an abstract representation of the code from the dynamic compiler. Data flow analysis is then conducted on the abstract representation. Redundant instructions in the machine code are identified and eliminated as a result of the data flow analysis. Other well-known systems describe methods for optimizing computer code generation by carrying out inter-procedural dead store elimination. However, none of the conventional compilers Or code analysis systems can efficiently optimize code segments with vectorized processing components.

Thus, a computer-implemented method and system for improved data flow analysis and optimization are needed.

BRIEF DESCRIPTION OF THE DRAWINGS

Embodiments illustrated by way of example and not limitation in the figures of the accompanying drawings, in which.

DETAILED DESCRIPTION

Figure 1:
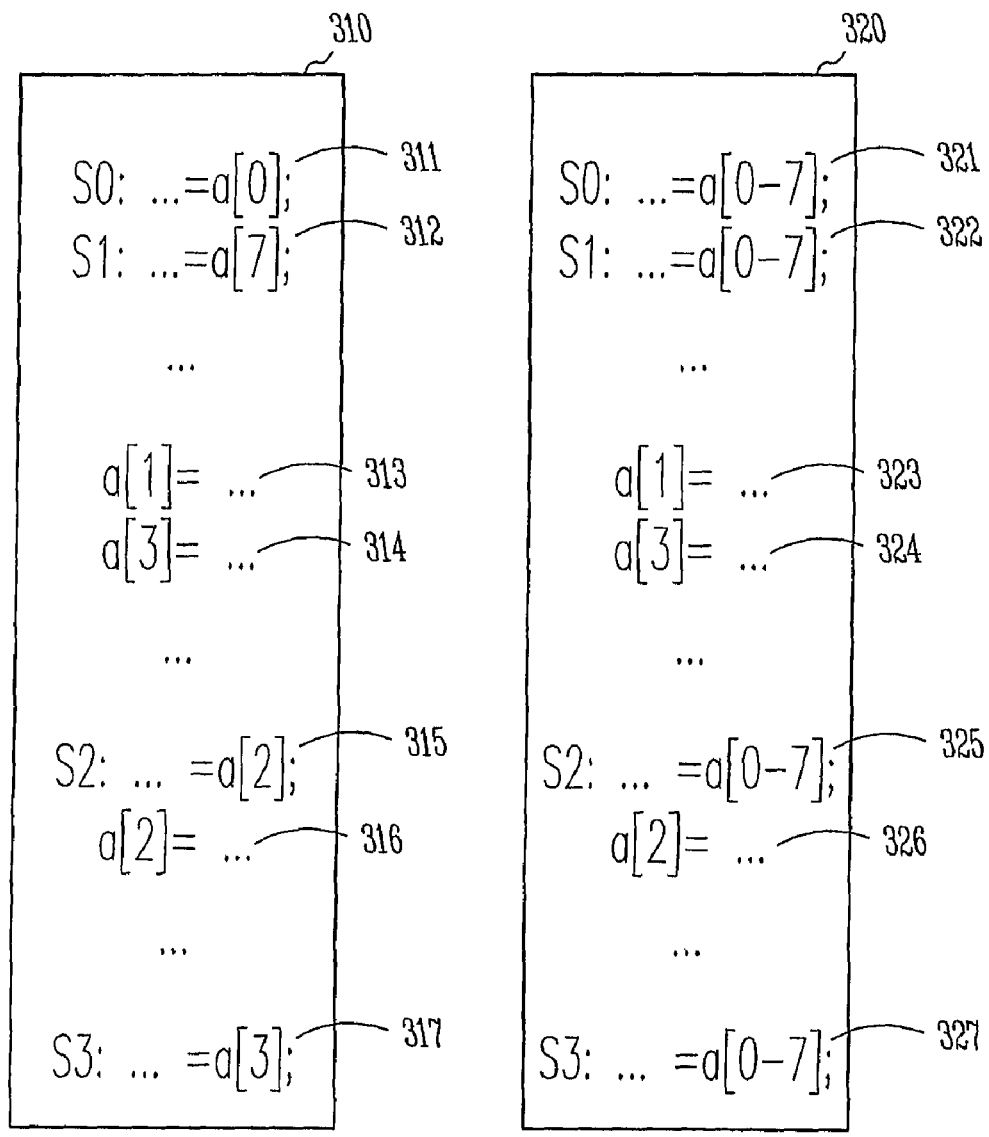
FIG. 1 is an example of non-vectorized and vectorized processing operations in a read aggregation example.

A computer-implemented method and system for improved data flow analysis and optimization are disclosed. In the following description, numerous specific details are set forth. However, it is understood that embodiments may be practiced without these specific details. In other instances, well-known processes, structures and techniques have not been shown in detail in order not to obscure the clarity of this description.

Data flow analysis is one of the most important processing analysis tools used hi computer code optimizations. In conventional data flow analysis, there are four basic data sets: GEN, KILL, IN and OUT. These data sets abstractly describe the data sets passing into and out of processing components of a computer program or a code segment. For example, the GEN data set describes data items newly created in a particular processing component. The KILL set describes data items invalidated or overwritten within the particular processing component. The IN and OUT data sets describe valid data items flowing into and out of the particular processing component, respectively. These data sets could apply over data flow nodes and/or basic processing blocks. In the context of this disclosure, nodes are each a single instruction, processing operation, or sets of instructions or processing operations with defined data inputs and outputs. The basic data flow equations describing these data sets are set forth below.

Forward: $OUTi=(INi-KILLi)+GENi$ $INi=\theta\ OUTj$, where j is a predecessor of i Backward: $INi=(OUTi-KILLi)+GENi$ $OUTi=\theta\ INj$, where j is a successor of i $\theta$ is union or intersection, which represent disjunctive or conjunctive. i and j are node identifiers.

Traditionally, the KILL and GEN data sets are computed according to the semantics of the flow nodes or basic blocks. These data sets are invariant in traditional data flow analysis. However, in the context of a particular program, some data items in the KILL and GEN data sets can be changed according to an optimization requirement. For example, if a new value to be assigned to a register/memory location is equal to the old value already stored in the same register/memory location, the old value can be reused after the assignment and the new assignment operation becomes unnecessary. Thus, the new assignment does not kill the old value. With this kind of data flow analysis information, a more aggressive level of optimization can be done on the processing components under analysis.

Various embodiments operate on computing structures known as vectorized processing components. In conventional data flow analysis, statements or instructions are the basic processing nodes. In most cases, the basic nodes can be divided into sub-components. In such case, we name the nodes as vectorized processing components. For example, each read in a vectorized read can be a sub-component; the reading or modifying of each bit in a 32-bit register can be a processing sub-component. Various embodiments relate to cases in which the basic node can be divided into sub-components (i.e. cases involving vectorized processing components).

A hole is a processing operation in a program which does not influence the functional behavior of the program whether or not the hole is removed. In most cases, a hole provides no functional benefit for the program and thus can be removed from the program. An example of a functionally non-beneficial operation is a NOP (no-operation) instruction or an operation to load a value into a register after which the value is never used. However, in vectorized processing components, the removal of holes is more problematic. In some cases, a hole cannot be removed as the hole operation may be required for other more important optimizations, such as vectorized access. For example, the vectorization of a read requires the reading of a continuous range of values. A sub-operation within this vectorized read (i.e. the reading of one value within the range of values) could be identified as a hole. However, this hole could not be removed from the vectorized read using conventional code optimization tools or else the vectorized read would be broken and the vectorization result invalidated.

Referring to FIG. 1, an example of a read aggregation is illustrated. A series of non-vectorized operations are shown in block 310, In the example of block 310, a sample processing operation (S0) 311 reads a value from a single unit location denoted a[0] (e.g. register, memory location, cache or buffer cell, stack location, and the like). Similarly, a sample processing operation (S1) 312 reads a value from a single unit location denoted a[7]. At sample statements 313 and 314, example assignment operations result in the values at single unit locations a[1] and a[3] being updated. In this example, the old values in unit locations a[1] and a[3] are killed by the new assignment operation. Following the assignment operations 313 and 314, sample processing operation (S2) 315 reads a value from a single unit location denoted a[2]. Following operation 315, an example assignment operation 316 results in the value at single unit location a[2] being updated. In this example, the old value in unit location a[2] is killed by the new assignment operation. Finally, a sample processing operation (S3) 317 reads a value from a single unit location denoted a[3].

Referring again to FIG. 1 at block 320, series of vectorized operations are shown. In the example of block 320, a sample processing operation (S0) 321 reads a set of values from a block of contiguous storage locations denoted a[0-7] (e.g. a register set, a block of memory locations, a set of cache or buffer cells, a group of stack locations, and the like). In the example, a set of eight contiguous storage locations are accessed; however, it will be apparent to those of ordinary skill in the art that a plurality of contiguous storage locations may similarly be supported. Conventional computer hardware provides the hardware functionality to execute such vectorized storage access operations. For example, the Intel® brand Internet Exchange Processor (abbreviated "IXP") supports such vectorized storage access operations. Similarly, conventional direct memory access (DMA) operations provide the processing capability to access a set of storage locations in a single vectorized operation. In the example of block 320, a sample processing operation (S1) 322 also reads a set of values from a block of contiguous storage locations denoted a[0-7]. As in block 310, sample statements 323 and 324 in block 320 are non-vectorized example assignment operations resulting in the values at single unit locations a[1] and a[3] being updated. In this example, the old values in unit locations a[1] and a[3] are killed by the new assignment operation. However, the other values read in the prior vectorized read operation 322 (e.g. values a[0], a[2], and a[4-7]) are not killed by assignments 323 and 324. Following the assignment operations 323 and 324, sample vectorized processing operation (S2) 325 reads a set of values from the block of contiguous storage locations a[0-7]. Following operation 325, an example non-vectorized assignment operation 326 results in the value at single unit location a[2] being updated. In this example, the old value in unit location a[2] is killed by the new assignment operation. Finally, a sample vectorized read operation (S3) 327 reads a set of values from the block of contiguous storage locations a[0-7].

In each of the vectorized processing operations described in the above example, a set of contiguous read operations represents a vectorized processing operation. It will be apparent to those of ordinary skill in the art that vectorized processing operations other than read operations are similarly covered. Each individual read operation of the set of contiguous read operations represents a sub-operation of the vectorized processing operation. For example, in the vectorized read operation S0: . . . =a[0-7], one sub-operation is denoted as . . . =a[0]. Also note that in the above examples of a vectorized operation, a number of processing holes may be created by the vectorized processing operations. For example, in operation 322, the vectorized read of a[0-7] at S1 is a hole; because, the same values read in operation 321 are never changed or used. As such, one optimization of the code represented by the example of block 320 could remove the vectorized read operation S1 (322). Similarly, the vectorized processing operation (S2) 325 also produces holes that could be optimized. In particular, the vectorized read operation 325 includes sub-operations rendered unnecessary because of the vectorized read operations performed at S0 (321) and S1 (322) and because all other single unit values of the vectorized read at S2 (325) are not used in subsequent processing. Specifically, the sub-operations on single unit values a[0-1]- and a[3-7] in vectorized operation 325 at S2 are holes; because, their values are never used in processing in subsequent processing. However, single unit values a[1] and a[3] are killed at operations 323 and 324, respectively. It would be desirable to remove holes at S2 during code optimization; however, conventional optimization systems cannot perform this optimization. Because the assignment operations at 323 and 324 kill the values in a[1] and a[3], the vectorized read at S2 (325) cannot be removed by conventional means. However, in various embodiments, context analysis is used to determine if values accessed in each of the sub-operations in a vectorized operation are used in subsequent processing. If it is determined that each of the values accessed in sub-operations in a vectorized operation are not used in subsequent processing, the vectorized operation can be removed through optimization as a hole. In the example above, context analysis is used to determine that the read values of a[1] and a[3] at S2 are not used in subsequent processing. Thus, by virtue of various embodiments described herein, the vectorized read at S2 (325) can be removed and the resulting code optimization improved.

As part of the solution described herein, the sub-operations of a vectorized operation that are needed in current or subsequent processing should be identified. In some cases, these needed sub-operations are part of a vectorized operation previously identified as a potential hole. As such these needed sub-operations are denoted herein as needed holes. For example, referring again to FIG. 1 at block 320, a vectorized read operation S2 (325) is shown. If it were not for the assignment operations 323 and 324, wherein the single unit values a[1] and a[3] are changed, the vectorized read operation S2 (325) could be identified as a hole and removed during optimization. As such, the sub-operation reads of a[1] and a[3] at S2 are needed holes. In another example shown in FIG. 1 at block 320, a vectorized read operation S3 (327) is shown. If it were not for the assignment operation 326, wherein the single unit value a[2] is changed, the vectorized read operation S3 (327) could be identified as a hole and removed during optimization. As such, the sub-operation read of a[2] at S3 (327) is a needed hole. Using the systems and processes described herein in various embodiments, an improved level of optimization is achieved in code with vectorized processing components.

Figure 2:
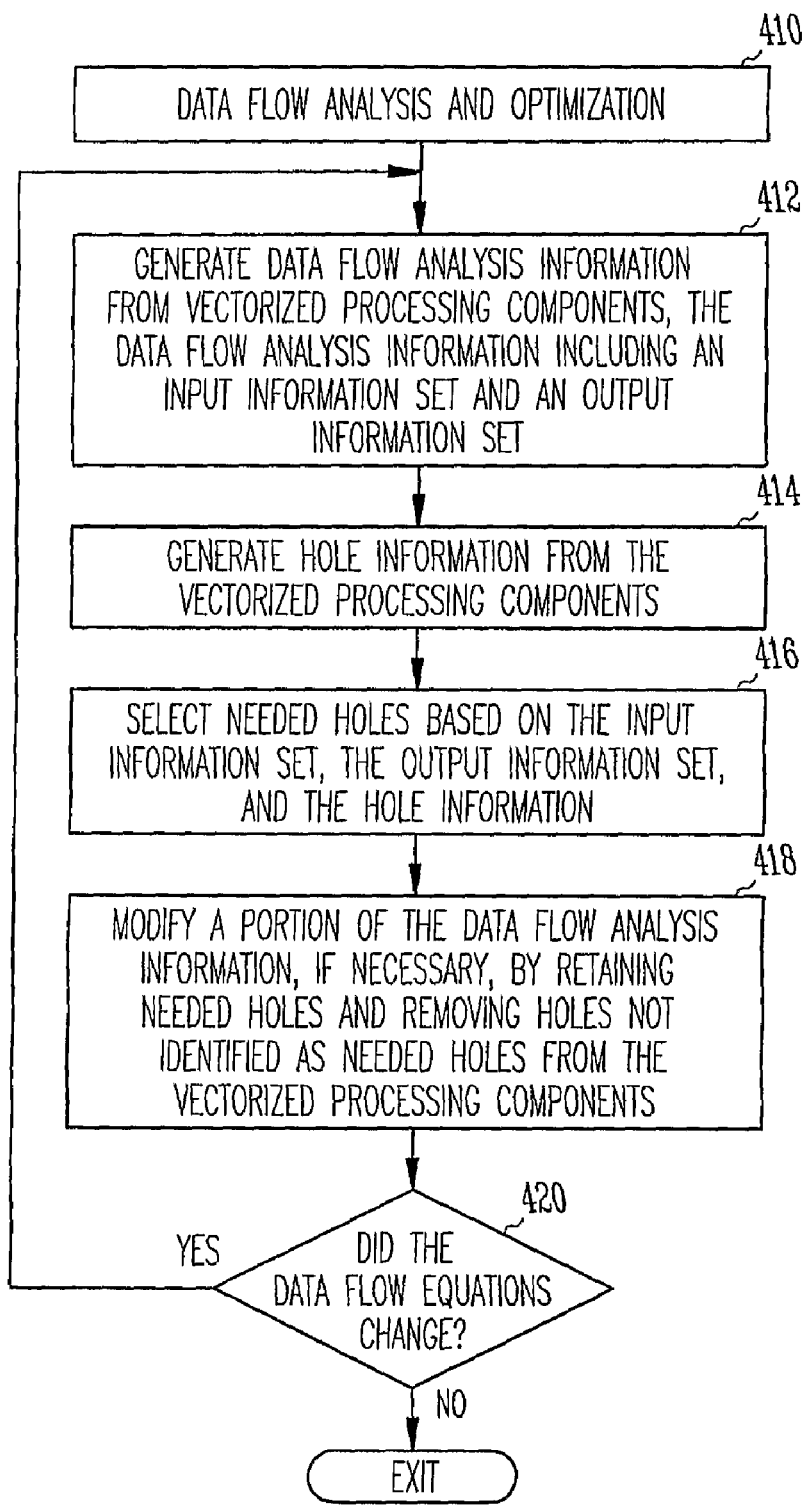
FIG. 2 is a flow diagram illustrating an embodiment of the data flow analysis and optimization method.

Referring to FIG. 2, a flow diagram illustrates the data flow analysis and code optimization of an embodiment. As part of the illustrated processing flow, data flow analysis is improved using context relative information. This context relative information enables the identification of needed holes and the achievement of resulting code optimization. In FIG. 2 at processing block 412, data flow analysis information is generated by a data flow analyzer from a set of vectorized processing components. The data flow analysis information includes an input information set and an output information set. In one embodiment, data sets including GEN, KILL, IN and OUT data sets for each node can be generated by traditional data flow analysis. As a result of this data flow analysis, the input information set and the output information set are generated.

In processing block at 414, hole information is generated by a hole detector from the vectorized processing components. In general, dead code detecting methods, data flow analysis, value analysis, and the like can be used to identify traditional holes. As described above, a hole is a processing operation in a program, which does not influence the functional behavior of the program whether or not the hole is removed. In most cases, a hole provides no functional benefit for the program and thus can be removed from the program. As also described above in relation to FIG. 1, holes in code segments containing vectorized processing components can be identified, but not necessarily removed at this stage in the optimization process. At processing block 414, hole information is generated to identify processing operations of the vectorized processing components that may be holes and thus potentially removable during code optimization. In one embodiment, a function (denoted herein as the HOLE function) can be defined that returns an identification of the holes identified at a given node i. Thus, HOLE(i) returns hole information identifying holes found at node i.

Note that in various embodiments, the sequence of the steps performed in processing blocks 412 and 414 can be reversed if the data flow analysis information generated in block 412 is not needed for the generation of the hole information in block 414.

In processing block 416, the previously generated input information set, the output information set, and the hole information is used to select needed holes in the vectorized processing components. As described above, needed holes can be sub-operations of a vectorized operation that are needed in current or subsequent processing. Typically, needed holes represent a portion of the sub-operations performed as part of a vectorized processing operation. Often, the sub-operations of a vectorized processing operation not identified as needed holes can be removed during code optimization. In processing block 416, needed holes of a vectorized processing operation are identified and selected for retention during subsequent code optimization. By implication, holes of a vectorized processing operation not identified and selected as needed holes can be marked for removal during subsequent code optimization. For example, referring again to FIG. 1 at block 320, the sub-operation reads of a[1] and a[3] at S2 are identified and selected as needed holes. These needed holes are retained during optimization. The remaining sub-operations of vectorized read operation S2 (325), (e.g. sub-operation reads of a[0], a[2], and a[4-7]) can be marked for removal as un-needed holes.

In one embodiment, a function (denoted herein as the SELECT function) can be defined that returns an identification of the needed holes at a given node i. SELECT can be a predicate, which selects needed holes from HOLE(i). This predicate can be defined according the requirements of a particular optimization. Thus, in the examples presented above in relation to FIG. 1:

SELECT(HOLE(S2))={read a[1], a[3]}

SELECT(HOLE(S3))={read a[2]}

In block 418, once the needed holes are identified and selected as a result of the processing in block 416, the data flow analysis information can be modified by a data flow modifier in conformity with the identified and selected needed holes. In particular, needed holes can be marked for retention and un-needed holes can be marked for removal during subsequent code optimization of the vectorized processing components.

According to the explanation of a hole as set forth above, it can be assumed that based on the hole information generated and needed holes identified as determined in processing blocks 414 and 416, the hole kills no data items at the corresponding node. Thus, the data flow equations can be modified as follows:

Forward: OUT$i$=OLD_OUT$i$+SELECT(HOLE($i$))

IN$i$=OLD_IN$i$+SELECT(HOLE($i$))

Backward: IN$i$=OLD_IN$i$+SELECT(HOLE($i$))

OUT$i$=OLD_OUT$i$+SELECT(HOLE($i$))

OLD_INi and OLD_OUTi are the same data sets as the INi and OUTi data sets computed in processing block 412 for node i. For example in FIG. 1 when considering removal of the vectorized read operation a[0-7] at S3 (327), SELECT (HOLE(S3))={read a[2]}. In FIG. 1 when considering removal of the vectorized read operation a[0-7] at S2, SELECT(HOLE(S2))={read a[1], a[3]}.

If there are no holes found for a given node or the SELECT function returns a null indicating there are no needed holes found, the data flow equations generated in block 412 are equivalent to traditional data flow equations. Otherwise, an aggressive data flow analysis can be performed by determining an appropriate SELECT group of needed holes. Because the data flow equations and hole information described herein are computed in the context of particular programs, the data flow equation at node i may be changed if the SELECT (HOLE(i)) set is not empty at node i. As such, the IN and OUT data sets of node i's successor nodes might be changed and some holes identified at node i may become non-holes as data flow analysis information for previous or subsequent nodes is modified. For example in FIG. 1 at block 320, if the optimization removes the read operation a[0-7] at S3 first, then the read operation a[3] at S2 becomes a non-hole. Then, the read[0-7] at S2 cannot be removed. In an alternative example, if the optimization removes the read a[0-7] at S2 first, then the read a[3] should be removed from OLD_IN(S3). There are various solutions to handle these cases. Two solutions are presented below by example. For example, to modify the data flow analysis information, one might:

Re-compute the OUTi for forward analysis (INi for backward analysis) after optimizing i. If the node's data set changes, re-compute the IN and OUT data sets of all the node's successor nodes and re-identify the holes. Otherwise, go-on analyzing.

Skip the elements selected in SELECT (HOLE(i)) as failure when analyzing the successors. Repeat the processing operations described in blocks 412, 414, and 416 after all the nodes are analyzed.

Solution 1 described above is an incremental method. This method is fit for incremental data flow analysis. One shortcoming is that the method should re-identify holes after each optimization by hole. Solution 2 is a somewhat simpler method but may be less efficient. This method may lose some efficiency in one iteration and it may re-compute the data flow equations that have not changed.

One embodiment is illustrated in the pseudo-code logic description presented below. It will be apparent to those of ordinary skill in the art, however, that other equivalent implementations are possible.

```
ChangedHoles.Empty( );
for (each vectorized reads VR)
{
    bool failed = false;
    tmpHoles.Empty( );
    for (each read r in VR)
    {
        if (r is in ChangedHoles)
        {// r has been treated as a hole in another node.
            failed = true;
            break;
        }
        else if (r is in IN(VR))
            continue;
        else if (r is a hole)      //suppose r is generated;
            add r to tmpHoles; // record the hole.
        else
        {
            failed = true;
            break;
        }
    }
    if (failed) continue;
    Remove VR;
    if (tmpDeads is not empty)
    {//record the holes used in optimization.
        Add tmpHoles to ChangedHoles;
    }
}
```

If solution 2 as described above is used at processing block 418 to modify a portion of the data flow analysis information, the processing performed at blocks 412, 414, and 416 should be repeated until there is no further change in the data flow equations.

In the pseudo-code logic presented above, if Changed-Holes is not empty after all reads are analyzed, the data flow equation and hole information has changed. As such, the optimization may repeat the processing performed at blocks 412, 414, and 416.

The techniques described above define a general framework to enhance traditional data flow analysis. Various embodiments can be implemented in traditional compilers. The techniques described herein improve the performance of compiler generated code, Various embodiments can remarkably improve the efficiency in some code segments by removing redundant IO operations, for example. Data flow analysis information is generated in the context of the program in addition to traditional data flow analysis. The improved data flow analysis framework described herein can identify and remove holes in vectorized processing components otherwise not removed or optimized by conventional means. In addition, the framework is consistent with traditional data flow analysis, which makes it easy to port and to extend to other optimization systems.

Figure 3A:
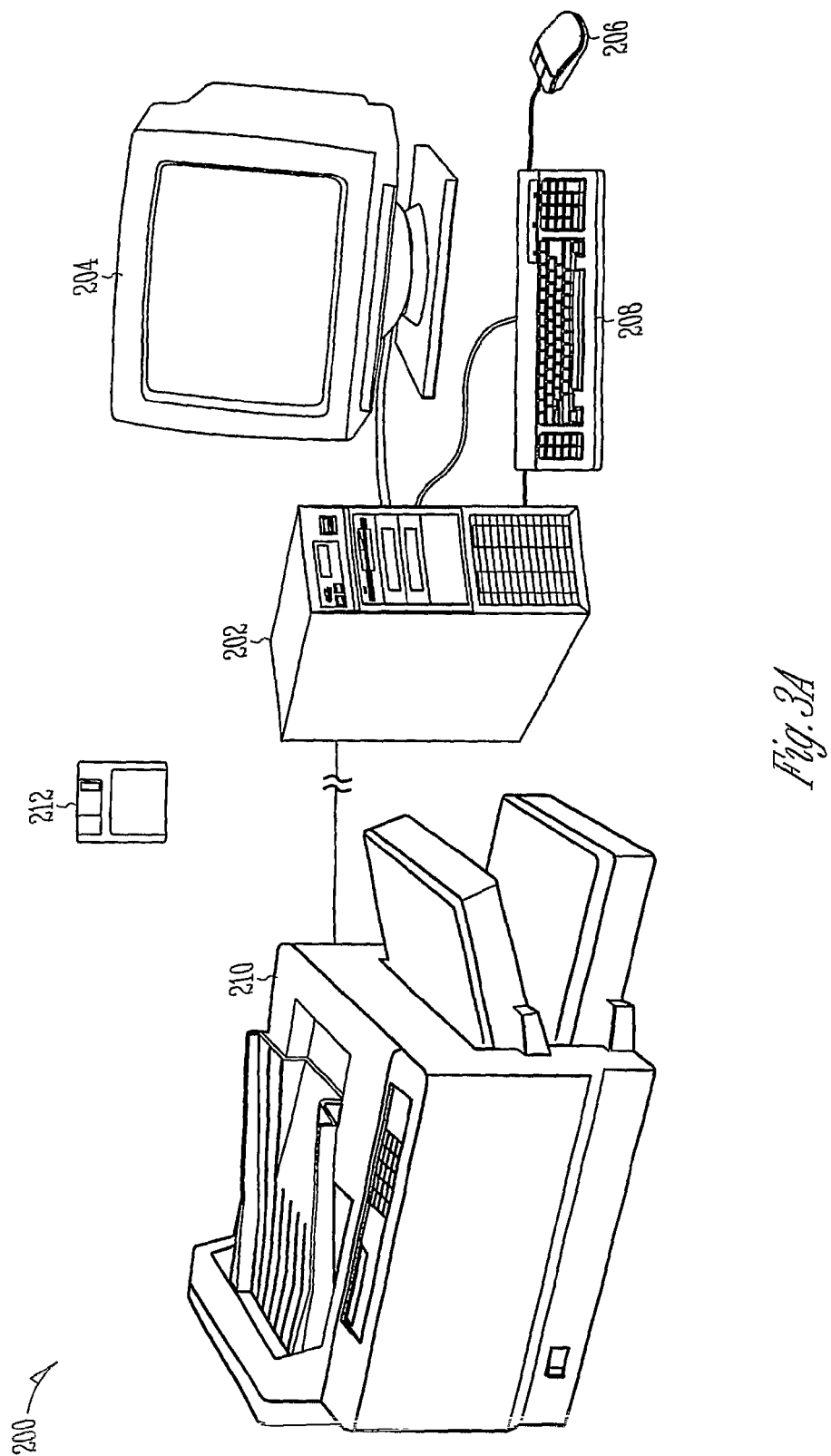
FIGS. 3a and 3b are block diagrams of a computing system on which an embodiment may operate and in which embodiments may reside.
Figure 3B:
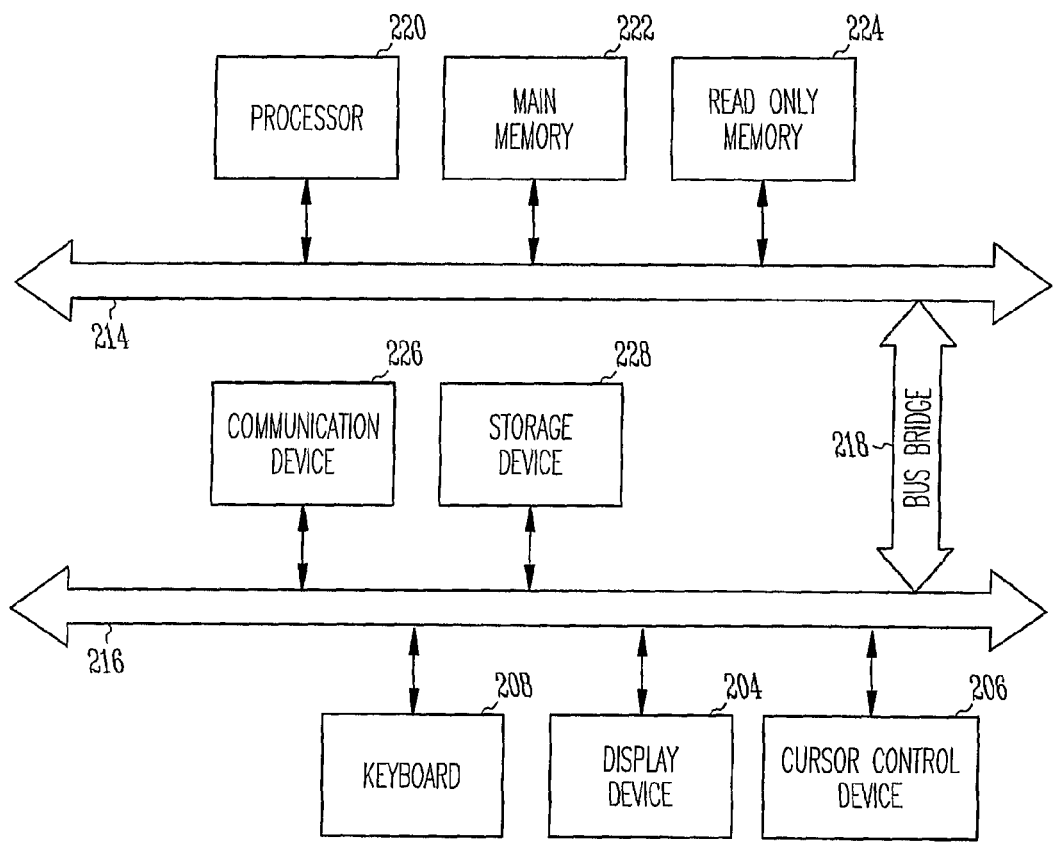

FIGS. 3a and 3b show an example of a computer system 200 illustrating an exemplary client or server computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk mid its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

A communication device 226 may also be coupled to bus 216 for accessing remote computers or servers, such as a web server, or other servers via the Internet, for example. The communication device 226 may include a modem, a network interface card, or other well-known interface devices, such as those used for interfacing with Ethernet, Token-ring, wireless, or other types of networks. In any event, in this manner, the computer system 200 may be coupled to a number of servers via a conventional network infrastructure.

The system of an example embodiment includes software, information processing hardware, and various processing steps, as described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

It should be noted that the methods described herein do not have to be executed in the order described, or in any particular order. Moreover, various activities described with respect to the methods identified herein can be executed in repetitive, simultaneous, recursive, serial, or parallel fashion Information, including parameters, commands, operands, and other data, can be sent and received in the form of one or more carrier waves through communication device 226.

Upon reading and comprehending the content of this disclosure, one of ordinary skill in the art will understand the manner in which a software program can be launched from a computer-readable medium in a computer-based system to execute the functions defined in the software program described above. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a pro-cedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment, including HTML and XML.

Thus, other embodiments may be realized. For example, FIGS. 3a and 3b illustrate block diagrams of an article of manufacture according to various embodiments, such as a computer 200, a memory system 222, 224, and 228, a magnetic or optical disk 212, some other storage device 228, and/or any type of electronic device or system. The article 200 may include a computer 202 (having one or more processors) coupled to a computer-readable medium 212, and/or a storage device 228 (e.g., fixed and/or removable storage media, including tangible memory having electrical, optical, or electromagnetic conductors) or a carrier wave through communication device 226, having associated information (e.g., computer program instructions and/or data), which when executed by the computer 202, causes the computer 202 to perform the methods described herein.

Various embodiments are described. In particular, the use of embodiments with various types and formats of user interface presentations may be described. It will be apparent to those of ordinary skill in the art that alternative embodiments of the implementations described herein can be employed and still fall within the scope of the claims set forth below. In the detail herein, various embodiments are described as implemented in computer-implemented processing logic denoted sometimes herein as the "Software". As described above, however, the claimed invention is not limited to a purely software implementation.

Thus, a computer-implemented method and system for improved data flow analysis and optimization are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

We claim:

1. A method comprising:
    generating data flow analysis information from vectorized processing components, the data flow analysis information including an input information set and an output information set, the vectorized processing components being basic processing operations that can each be divided into sub-component processing operations;
    generating hole information from the vectorized processing components, the hole information identifying potential holes in the vectorized processing components;
    distinguishing functionally beneficial operations from holes based on the input information set, the output information set, and the hole information; and
    modifying a portion of the data flow analysis information by retaining functionally beneficial operations and removing holes from the vectorized processing components;
    wherein functionally beneficial operations are ones necessary to retain the validity of a vectorized processing result.

2. The method as claimed in claim 1 wherein the hole information includes information indicative of at least one sub-operation of a vectorized access operation.

3. The method as claimed in claim 2 wherein the vectorized access operation is a data read operation.

4. The method as claimed in claim 1 further including modifying the vectorized processing components in conformity with the modified data flow analysis information.

5. An article of manufacture embodied as a non-transitory machine-accessible medium including data that, when accessed by a machine, causes the machine to perform operations comprising:
    generating data flow analysis information from vectorized processing components, the data flow analysis information including an input information set and an output information set, the vectorized processing components being basic processing operations that can each be divided into sub-component processing operations;
    generating hole information from the vectorized processing components, the hole information identifying potential holes in the vectorized processing components;
    distinguishing functionally beneficial operations from holes based on the input information set, the output information set, and the hole information; and
    modifying a portion of the data flow analysis information by retaining functionally beneficial operations and removing holes from the vectorized processing components;
    wherein functionally beneficial operations are ones necessary to retain the validity of a vectorized processing result.

6. The article of manufacture as claimed in claim 5 wherein the hole information includes information indicative of at least one sub-operation of a vectorized access operation.

7. The article of manufacture as claimed in claim 6 wherein the vectorized access operation is a data read operation.

8. The article of manufacture as claimed in claim 5 further including modifying the vectorized processing components in conformity with the modified data flow analysis information.

9. A system comprising:
    a processor;
    a memory coupled to the processor to store vectorized processing components;
    a data flow analyzer to generate data flow analysis information from the vectorized processing components, the data flow analysis information including an input information set and an output information set, the vectorized processing components being basic processing operations that can each be divided into sub-component processing operations;
    a hole detector to generate hole information from the vectorized processing components, the hole information identifying potential holes in the vectorized processing components, the hole detector further to distinguish functionally beneficial operations from holes based on the input information set, the output information set, and the hole information; and
    a data flow modifier to modify a portion of the data flow analysis information by retaining functionally beneficial operations and removing holes from the vectorized processing components;
    wherein functionally beneficial operations are ones necessary to retain the validity of a vectorized processing result.

10. The system as claimed in claim 9 wherein the hole information includes information indicative of at least one sub-operation of a vectorized access operation.

11. The system as claimed in claim 10 wherein the vectorized access operation is a data read operation.

12. The system as claimed in claim 9 wherein the data flow modifier further to modify the vectorized processing components in conformity with the modified data flow analysis information.

* * * * *